United States Patent [19]

Benezet

[11] Patent Number: 5,278,395
[45] Date of Patent: Jan. 11, 1994

[54] PORTABLE ELECTRONIC ACCESS CONTROLLED SYSTEM FOR PARKING METERS OR THE LIKE

[75] Inventor: Paul Benezet, Soisy Sur Seine, France

[73] Assignee: Hello S.A., Paris, France

[21] Appl. No.: 936,604

[22] Filed: Aug. 27, 1992

[30] Foreign Application Priority Data

Sep. 3, 1991 [FR] France ................... 91 11031

[51] Int. Cl.⁵ ............................................ G07B 15/02
[52] U.S. Cl. ..................................... 235/384; 235/382
[58] Field of Search ............................. 235/384, 382

[56] References Cited

U.S. PATENT DOCUMENTS

| | | |
|---|---|---|
| 4,634,846 | 1/1987 | Harvey et al. . |
| 4,709,136 | 11/1987 | Watanabe . |
| 4,717,815 | 1/1988 | Tomer ...................... 235/384 |
| 4,769,765 | 9/1988 | Green ...................... 235/382 |
| 4,812,805 | 3/1989 | Lachat et al. ............ 235/384 |
| 4,861,971 | 8/1989 | Chan ....................... 235/384 |
| 4,982,070 | 1/1991 | Bezin et al. ............. 235/384 |
| 5,093,862 | 3/1992 | Scwatz .................... 235/382 |
| 5,101,098 | 3/1992 | Naito ...................... 235/382 |
| 5,122,643 | 6/1992 | Gamou et al. ........... 235/384 |
| 5,166,680 | 11/1992 | Ganot ...................... 235/384 |

FOREIGN PATENT DOCUMENTS

| | | |
|---|---|---|
| 0081921 | 6/1983 | European Pat. Off. . |
| 0193920 | 9/1986 | European Pat. Off. . |
| 0355372 | 2/1990 | European Pat. Off. . |
| 0402821 | 12/1990 | European Pat. Off. . |
| 0447312 | 9/1991 | European Pat. Off. .......... 235/384 |
| 3435697 | 4/1986 | Fed. Rep. of Germany . |
| 2615304 | 11/1988 | France . |
| 0297297 | 12/1990 | Japan ................................ 235/382 |

Primary Examiner—John Shepperd
Assistant Examiner—Yu S. Lin
Attorney, Agent, or Firm—Merchant, Gould, Smith, Edell, Welter & Schmidt

[57] ABSTRACT

An electronic system of the type comprising:
at least one portable device comprising an electronic storage memory;
at least one device including a transfer module designed to be coupled temporarily with at least a portable object so as to set up a communication link with the memory, wherein the system comprises a set of specialized portable objects for the access control function and wherein the device comprises two states:
a free access state,
a controlled access state in which the working of the device is conditional upon the coupling, at least occasionally, of one of the portable objects for access control.

11 Claims, 4 Drawing Sheets

PORTABLE ELECTRONIC ACCESS CONTROLLED SYSTEM FOR PARKING METERS OR THE LIKE

BACKGROUND OF THE INVENTION

1. Field of the Invention

The field of the invention is that of car radios, microcomputers, fax machines, telephones or, again, systems for using up consumption units, for example accounting devices used to count periods of regulated parking. More specifically, the present invention relates to an electronic system with controlled access.

Generally speaking, the invention relates to any electronic system that can be fraudulently misappropriated, and notably to transportable or portable electronic systems. These electronic systems, which are often considerably valuable, are frequently left where they can be seen by potential thieves: for example they are left inside automobiles. This is thus the case with car radios or car telephones which may be a temptation that often causes windows and doors to be broken.

2. Description of the Prior Art

Another electronic system of this type is constituted by accounting devices, used to count periods of regulated parking, that are designed to be placed behind the windscreens of vehicles. A device such as this is described, for example, in the French patent application No. 87/06776 filed on behalf of the SOCIETE INTERNATIONALE POUR L'INNOVATION. These devices, constituted by a pack cooperating with a prepaid electronic ticket, for example a memory card, to decrement fee units memorized in the card as a function of the parking period, are also a focus of interest for potential thieves. This type of device, which can be used to eliminate the need for fixed individual posts (of the pavement parking meter type) or posts used in common by groups of vehicles (of the type installed at the entrances to parking lots), is hired out or sold by municipalities and has a definite value. Since their function entails their being exposed so that they can be seen by officials entrusted with ascertaining, notably, that the parking time has been properly accounted for, they cannot, at least during operation, be removed from the sight of ill-intentioned individuals.

A solution could be envisaged where access to such electronic systems is controlled by making their use conditional on the knowledge of a confidential code, similar to the codes needed to use cash cards or bank credit cards. The numerous data-processing innovations that have been achieved in fields as varied as those of banking, office automation and domestic automation applications have greatly increased the use of codes of this type. Since these codes are confidential and generally ought not to be written on any document carried by the user, it becomes very difficult to memorize them and, above all to make the association between each code and the nature of the operation that it is supposed to authorize. Furthermore, the fact of forgetting a code totally paralyzes the use for which this code is intended, and it generally becomes necessary, notably in banking applications, to have recourse to a complicated procedure in order to obtain knowledge of this code again.

The aim of the present invention is to propose an electronic system with controlled access that is not necessarily linked to the knowledge of a code.

More specifically, an aim of the invention is to provide a system such as this that deprives thieving of any attendant rewards by making this system unusable without the possession of objects that are solely in the hands of the authorized users.

Another aim of the invention is to provide a system such as this wherein the user can decide whether or not it should work in controlled access mode.

A particular object of the invention is to provide a system for using up consumption units, such as an accounting device, with controlled access, for the counting of periods of parking. The invention is particularly promising for this type of device in that it permits its customization. Thus, manufactures of this kind of apparatus can provide packs which, as desired by the user, may or may not be placed in a controlled access mode of operation. A user making use of his prepaid parking pack in a city where thieving is common can customize his device so that none but himself can use it. A user living in a peaceful city where thieving is uncommon can, for his part, choose to keep his device in a free access mode of operation. Should there be a recrudescence of thefts, he will always have the possibility of switching the system over into the controlled access mode of operation. To achieve this, all he needs to do is to acquire a specific card (an access control card), distinct from the cards bearing the consumption units. The first insertion of this card into the device will irreversibly switch the device over into a state of controlled access while at the same time customizing said device since the controlled access card inserted is the obligatory personal key needed to use the device. If necessary, in particular circumstances, provision may be made for a system wherein a competent authority can bring the device back into the free access state by means of a technical manipulation of a specific "master card". However, this arrangement is a vulnerable aspect of the system since, with its becoming possible for the system to return the free access state, such a return could be done fraudulently.

SUMMARY OF THE INVENTION

The invention relates to an electronic system of the type comprising:
  at least one portable device comprising an electronic storage memory;
  at least one device including a transfer module designed to be coupled temporarily with at least said portable object so as to set up a communication link with said memory,
wherein said system comprises a set of specialized portable objects for the access control function and wherein said device comprises two states:
  a free access state in which the operation of the device is achieved without its being necessary to use a portable object for access control,
  a controlled access state in which the working of the device is conditional upon the coupling, at least occasionally, of one of said portable objects for access control.

In a particularly promising feature, said controlled access state is a latent state when said device is in the free access state, said device being placed irreversibly in the controlled access state as soon as one of said portable objects for access control has been coupled thereto at least once.

In a particular embodiment, the invention also relates to a system for the consumption of consumption units of the type comprising:

a plurality of portable objects, each comprising an electronic storage memory;

at least one device including a transfer module designed to get coupled temporarily with at least one of said portable objects so as to set up a communications link with said memory, the operation of said device automatically linked to the consumption of said consumption units, wherein said system comprises a first set of specialized portable objects for the access control function and a second set of specialized portable objects for the storage of consumable units, wherein said transfer module comprises means to authorize and/or inhibit the operation of said device, wherein said authorizing and/or inhibiting means are controlled by said portable objects for access control, and wherein said device comprises two states:
- a free access state, in which the operation of the device is carried out without its being necessary to have recourse to a portable object for access control,
- a controlled access state, in which the operation of the device is conditional upon the coupling, at least occasionally, of one of said portable objects for access control.

Also advantageously, said controlled access state is a latent state when said device is in the free access state, said device being placed irreversibly in the controlled access state when one of said portable objects for access control has been coupled thereto at least once.

The invention also relates to a device for the implementation of a such a system, including a transfer module comprising means to authorize and/or inhibit the operation of said device, and comprising a memory zone having a code field designed to receive an access code, wherein said authorizing and/or inhibition means comprise means for the comparison of said memorized access code with an access code given by the user.

Preferably, the device comprises means for the memorization of said access code in said code field at the first coupling of the transfer module with a portable object for access control bearing an access code, the access code memorized in said code field being the access code borne by said first coupled, portable object for access control.

Also preferably, the means by which the user gives the access code comprise the coupling of a portable object carrying said access code and/or the use of a keyboard to enter said code.

Advantageously, the device is one wherein said inhibition and/or authorization means include a control field or flag placed in said memory zone, wherein the value contained in said control field is updated by said means for comparing the memorized access code with the access code introduced by the user, and wherein said authorization and/or inhibition means authorize or inhibit the operation of the device as a function of said value contained in said code field.

The invention also relates to different methods for the use of a system according to the invention.

According to a first variant, said portable objects for access control have to be inserted into said device before each instance of use of this device.

According to another variant, said portable objects for access control have to be inserted into said device every N times that this device is used or every X periods.

BRIEF DESCRIPTION OF THE DRAWINGS

The invention as well as its different advantages shall be understood more easily from the following description of exemplary embodiments, made with reference to the appended drawings, of which.

MORE DETAILED DESCRIPTION

Figure 1:
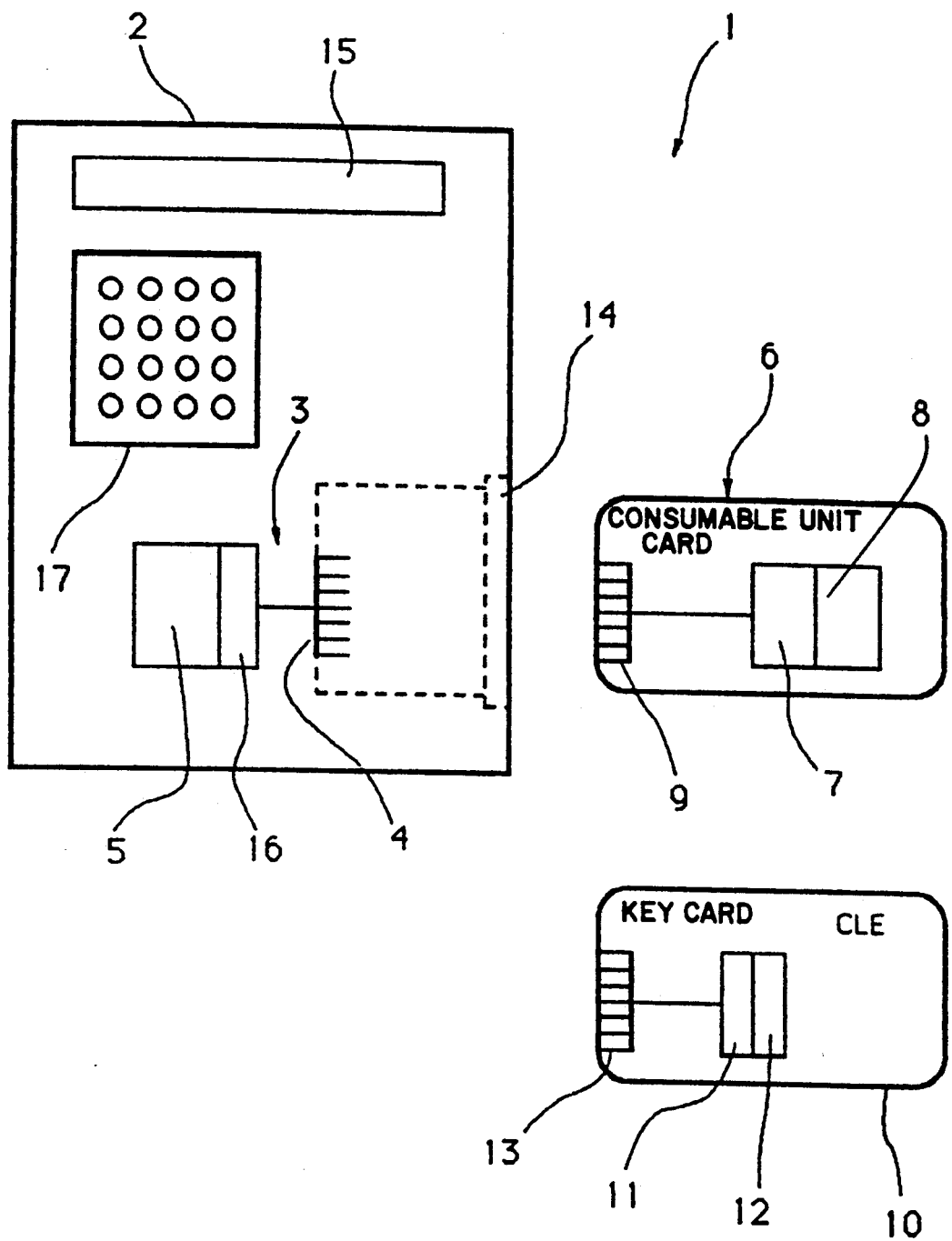
FIG. 1 shows the different elements of a system for using up consumption units with controlled access designed for accounting for periods of regulated parking.

The system according to the invention comprises any electronic device, the operation of which may be servo-linked to an authorization of access designed to authorize (or inhibit) its operation.

In other words, the device must ascertain that it is "entitled" to operate by means of an access control procedure implementing a condition of access control.

According to the invention, the implementation of this condition of access control takes the concrete form of the use of portable objects for access control such as memory cards.

Several cases of implementation of this general principle may be distinguished.

Case 1: The device can work only in controlled access mode. The user must routinely identify himself in order to use the device. He does so, for example whenever he uses it or according to any other adequate modality (every N instances of use or every X hours of operation, etc.) In this case, the use of the device implies the possession of a specialized memory card for the access control, that is compatible with access control means located in the device. These access control means are, for example, preprogrammed during manufacture or when the device is handed over to the user. According to one variant, they may also be programmed by the first insertion of an access control card by the user himself. In every variant, the aim is to pair the device with a given access control card so as to prohibit the use of the device in question by any person not possessing this access control card.

Case 2: the device has two states:
- a free access state,
- a controlled access state in which the operation of the device is servo-linked to a access control procedure of the type described in relation to case 1.

It is possible to provide for an arrangement where the device is in the free state at the outset and where the switching over from the free access state to the controlled access state is done irreversibly once an access control card is inserted. In certain variants, other methods of changing from one state to another may be conceived by those skilled in the art.

When the device is in the controlled access state, the access control card may be used in one of the following ways:
- the obligatory and routine insertion of the access control card before each use of the system;
- the insertion of the access control card only on certain occasions, for example every N times that a card of consumable units is inserted, or every X periods.

The following description of an exemplary embodiment relates more particularly to the implementation of the invention in a memory card time-accounting device of the portable parking meter type.

Naturally, the detailed description of this exemplary embodiment is not intended to restrict the scope of the invention which can be applied, in its general principles, to any device that is to be given a latent access control function.

The term "time-accounting device" is understood to mean an apparatus constituted, for example, by a pack, preferably portable, that is designed to be installed behind the windscreen of a vehicle and cooperates with a prepaid electronic ticket, for example a memory card, to decrement fee units memorized in the card, as a function of the parking period. This type of device can be used to eliminate the need for fixed individual posts (of the pavement parking meter type) or posts used in common by groups of vehicles (of the type installed at the entrances to parking lots). The user pays the parking fees automatically by introducing a prepaid memory card into his box. The boxes are generally sold, loaned or given out on hire by local authorities or their agents who sell parking units in the form of cards of a different type for each local authority. The validity of the parking can be verified by means of a display device on which there appear the various elements of information needed by the checking staff, for example the number of the parking zone selected by the user, a code identifying notably the type of card inserted by the user into the box and representing the town or city in which the parking is being done and, as the case may be, an information element indicating an infringement of regulations, and the number of fee units still available in the card. The memories of the cards may be either rewritable or irreversibly written. The pack of the device comprises means for the management of cards inserted into the pack. The pack also has an internal clock that gives the time (hour+minutes) and the current date and makes a regular countdown of the fee units and takes into account the periods of time during the day when parking is free.

The validity of the parking is checked by an official who ascertains notably, by means of the data elements displayed on the pack, that the device has truly been put into operation, that the inserted card truly corresponds to the town or city in which the parking is being done, that the electronic system of the pack has not been damaged or that it is not a spurious model, that the fee units for the payment of the parking have not all been consumed and that the maximum parking time allowed has not been exceeded. Should the checking official find that one of these criteria is not met, he would be entitled to lay a charge against the owner of the offending vehicle.

According to FIG. 1, a system 1 for using up consumption units used in an accounting system for parking periods comprises:

a pack 2 including a transfer module 3 having coupling means 4 linked to an internal electronic circuit 5 communicating notably with means 16 to authorize and/or inhibit the operation of the pack 2, and designed to be temporarily coupled with means for the coupling of portable objects such as a memory card. To this end, the park 2 has a slot 14 enabling the insertion of a memory card so as to permit the contact of the coupling means of a card such as this with the coupling means 4 of said pack 2. This pack is furthermore provided with information means, for example means constituted by a liquid-crystal display unit 15 or by a device to broadcast audio messages. These information means are designed notably to inform the user during the access control procedure. The pack 2 also has a keyboard which may comprise only an limited number of keys, enabling notably the sending of commands to the electronic circuit of the transfer circuit but also capable of being used to enter, for example, the time when the parking starts or the parking zone or to carry out time resetting operations etc., a first portable object constituted by a memory card 6 provided with control and addressing means 7 and with an electronic memory 8 connected to coupling means 9 capable of getting coupled temporarily with the coupling means 4 of the transfer module 3 of the pack 2, said electronic memory 8 containing consumable units of parking time paid for in advance when said memory card 6 is purchased, a second portable object constituted by a memory card 10, hereinafter called a key, also provided with control and addressing means 11 and an electronic memory 12 connected to coupling means 13 capable of getting coupled temporarily with the coupling means 4 of the transfer module 3 of the pack 2. Said electronic memory 12 contains an access code for the operation of the pack. This access code is constituted by a combination of alphanumerical characters. By using a five-character code, it is possible to have ten billion possible combinations available.

Thus, the system may be configured so that it cannot operate except in controlled access mode so as to prohibit the use of the device in question by any individual who does not possess an access control card. In this case, the user must routinely identify himself in order to use the device, for example at each instance of use or again according to any other adequate modality (every N instances of use, every X hours of operation etc.). In this case, the use of the device is conditional upon the possession, by the user, of the access control memory card (the key) 10 enabling access control and cooperating with the means 16 for the authorization and/or inhibition of the operation of the pack 2. These authorization and/or inhibition means may be preprogrammed, for example, during the manufacture of the card or when the device is handed over to the user. They may also be programmed, according to a first variant, by the first insertion of an access control card by the user himself.

The system 1 according to FIG. 1 can also be configured so that the pack 2 can have two states of operation:
- a free access state in which it is allowed to operate once the memory card 8 possessing available consumable units has been coupled to it;
- a controlled access state in which the operation of the device is servo-linked to an access control procedure.

It is also possible to provide for an arrangement where the device is in free access mode at the outset, and where the switching over from the free access state to the controlled access state is done irreversibly as soon as the access control card 10 is inserted. In certain variants, other modalities of passing from one state to the other may be conceived by those skilled in the art.

In one variant of the invention however, the device may be replaced, in the free access position, by specific means (not accessible to the user) for example when the user has lost his card. He may then return the apparatus to the manufacturer or to one of the manufacturer's certified agents to get his device "unlocked". Once unlocked, the device may be again switched over from the free access state to the controlled access state irreversibly by the insertion of an access control card 10.

Figure 2:
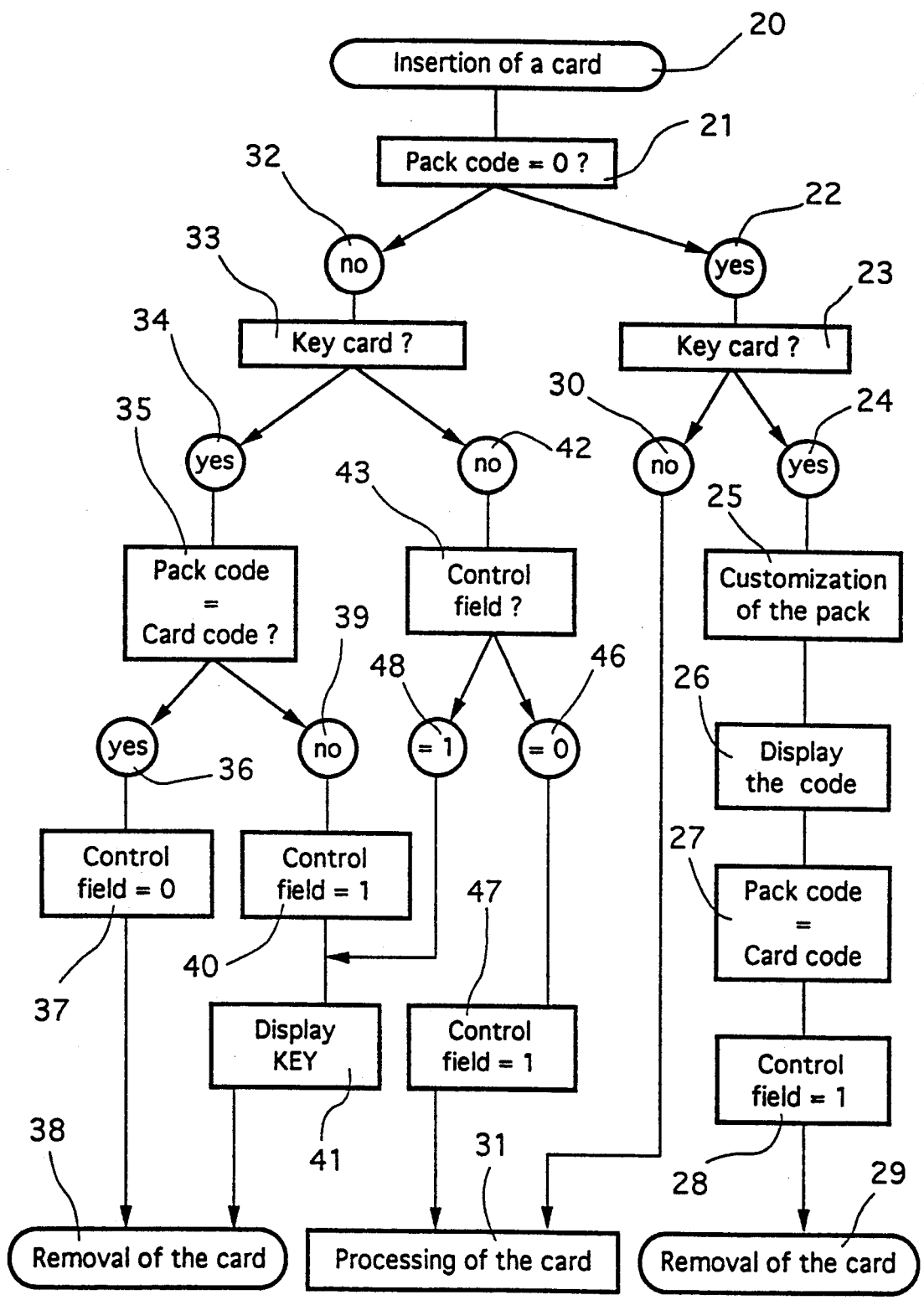
FIG. 2 shows the flow-chart of a first mode of operation of the system according to the invention.
Figure 3:
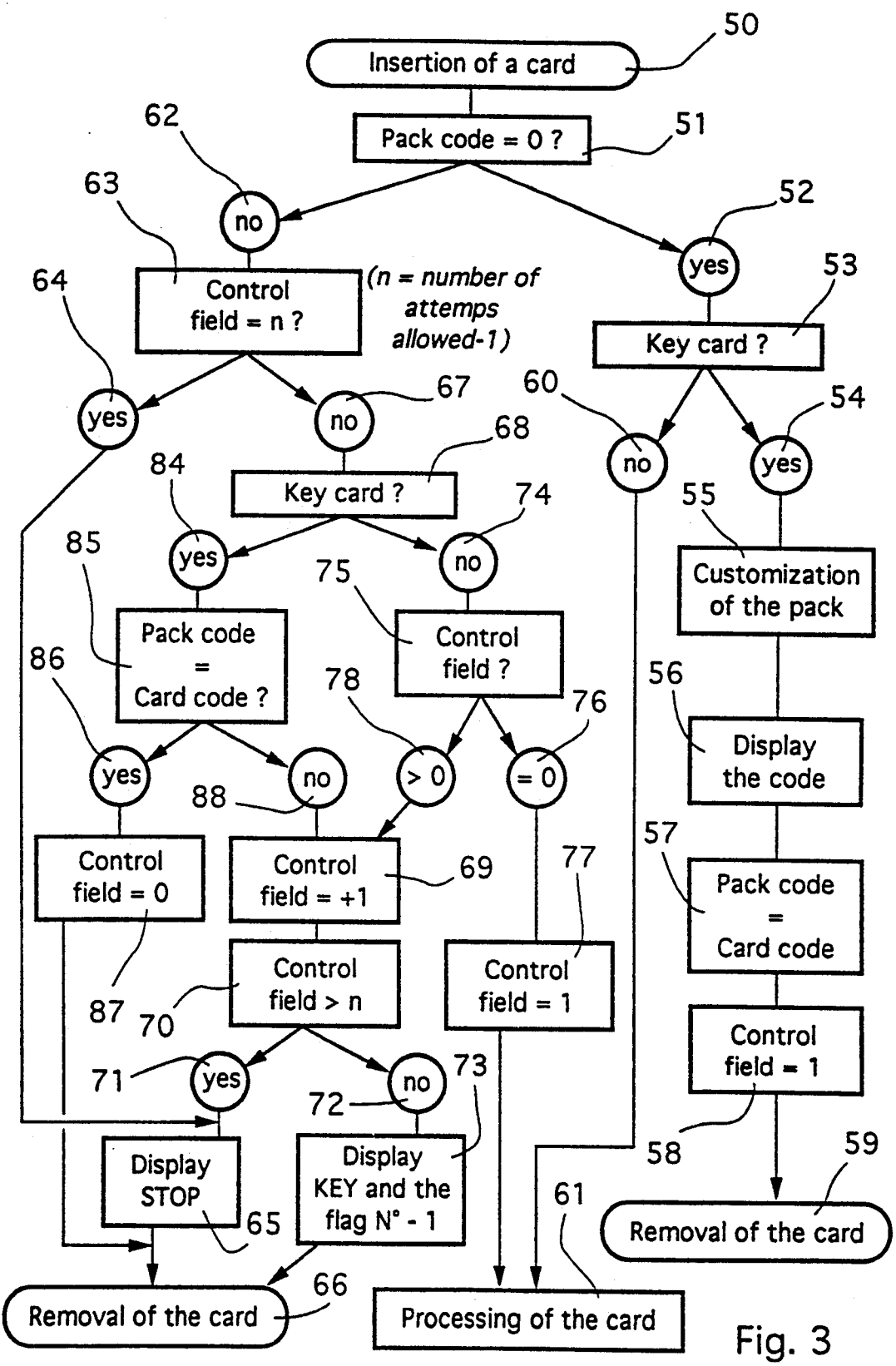
FIG. 3 shows the flow-chart of a second mode of operation of the system according to FIG. 1.
Figure 4:
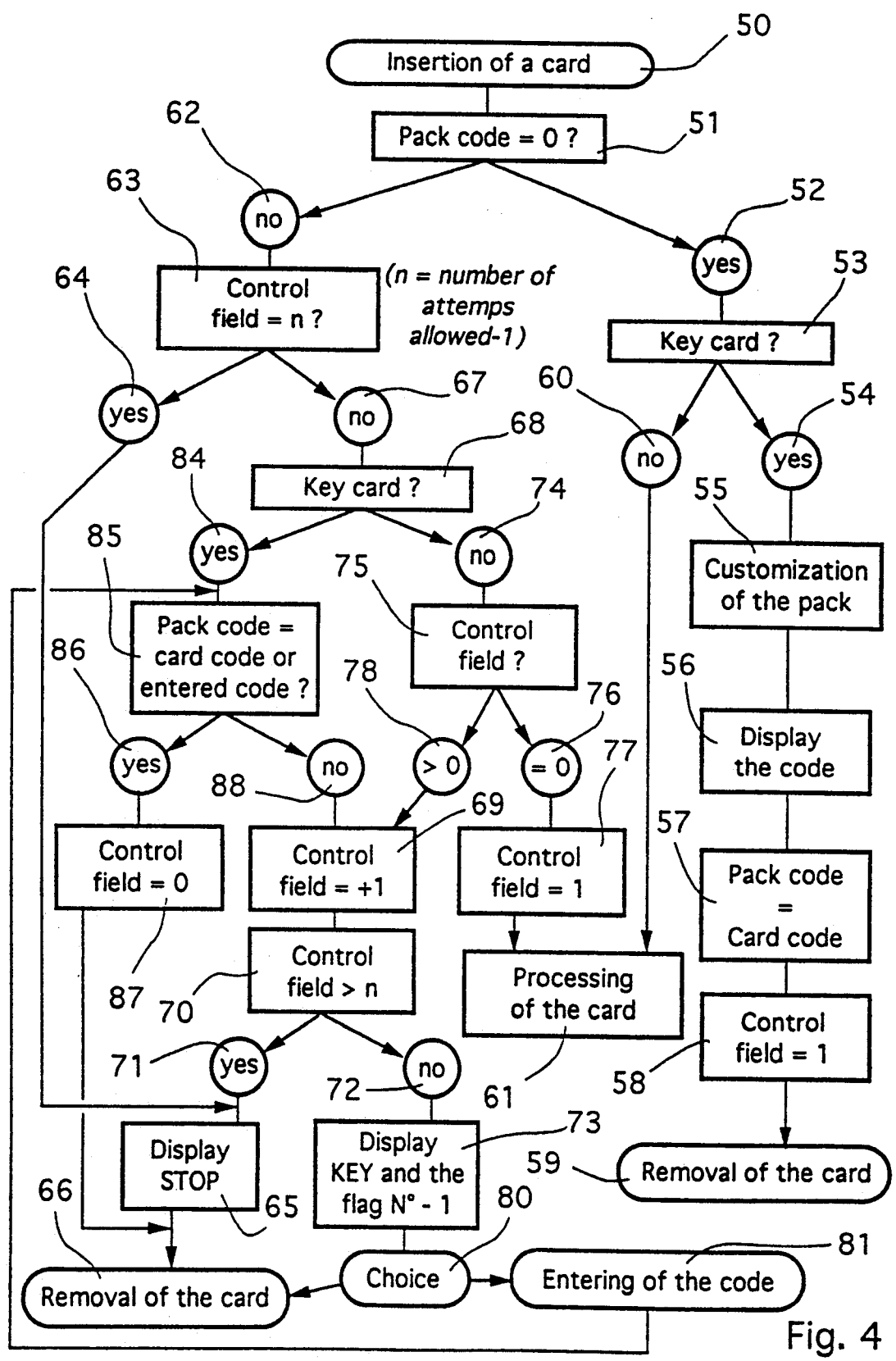
FIG. 4 shows the flow-chart of a third mode of operation of the system according to FIG. 1.

FIGS. 2, 3 and 4 show different flow charts of the operation of the system according to claim 1, relating to an equivalent number of methods of use of this system.

According to FIG. 2, the pack 2 of the system 1 has two states of operation:
- a free access state and
- a controlled access state.

The switching over from the free access state to the controlled access state is done irreversibly at the first insertion of the key 10. When the pack 2 is in the position of operation with controlled access, the user should insert the key card 10 before any insertion of the card with units 6. Before this first insertion, the pack can function once the memory card 8, carrying available consumable units, is coupled to it.

The system then works as follows:

At the insertion (20) of a memory card into the pack 2, the electronic circuit 5 of the transfer module 3 checks the value contained in the code field of said authorization and/or inhibition means 16 in order to determine whether or not this value is equal to 0 (21).

If this value is equal to 0 (22), it means that the pack is in free access mode: it can operate without a key card. The card that has been inserted is then tested in order to determine whether it is a key card 10 or a card 6 with consumable units (23).

If it is a key card (24), the pack 2 is switched over into a controlled access state (25) of operation. The code recorded in the memory 12 of the key card 10 is read and displayed (26) and the value of the control field or flag 18b of the memory zone 18 of the authorization and/or inhibition means 16 of the transfer module 3 takes the value of the code of the key card 10 (27). The control field 18b also located in the memory zone 18 of the authorization and/or inhibition means 16 of the transfer module 3 then takes the value 1 in such a way as to report the passing of the pack into the state of controlled operation (28). The card 10 is then ejected or removed from the pack 2 (29).

If the inserted card is not a key card (30), it is a consumable units card 6 and, since the pack 2 works in free access mode, the card 6 can be processed so as to decrement the consumable units recorded in its memory 12 (31).

If the value contained in the code field 18a of the memory zone 18 of the authorization and/or inhibition means 16 of the transfer module 3 is different from 0 (32), the box works solely in the position of controlled access operation. The card inserted into the pack is thus tested by the electronic circuit 5 so as to determine whether it is a card with consumable units or a key card (33). If it is a key card (34), the value of the code contained in the memory zone 18 of the authorization and/or inhibition means 16 of the transfer module 3 is compared with the code of the key card (35). If the two codes are equal (36), the value of the control field 18b is brought to 0 (37) so as to inform the electronic circuit 5 that the code tested is the right one. The key card is then ejected or removed. If this is not so (39), the value of the control field 18b is fixed at 1 (40), the message KEY is displayed (41) and the card is ejected or removed (38).

If the inserted card is not a key card but a card with units (42), the value of the control field 18b is checked (45) so as to determine whether it is equal to 0 or to 1, i.e. whether the appropriate key card has been truly introduced beforehand to the card with units 6. If the control field 18b is equal to 0 (46), then the key card has necessarily been introduced beforehand to the card with units and the operation of the device is authorized. The value of the control field 18b is again fixed at 1 (47) and the card is processed. If the value of the control field 18b is equal to 1 (48), the key card bearing the access code has not been introduced and the message "KEY" is displayed.

According to FIG. 3, the working of the pack 2 of the device 1 shows a state of free operation and a state of controlled operation.

The device is designed to permit a defined number of attempts at inserting a key card, when the pack is in a state of operation with controlled access.

The switching over into the state of operation with controlled access is prompted during the first insertion of the key 10.

The system 1 then works as follows:

At the insertion (50) of a memory card into the pack 2, the electronic circuit 5 of the transfer module 3 checks the value contained in the code field 18a of said authorization and/or inhibition means 16 in order to determine whether or not this value is equal to 0 (51).

If this value is equal to 0 (52), it means that the pack is in free access mode: it can operate without a key card. The card that has been inserted is then checked in order to determine whether it is a key card 10 or a card 6 with consumable units (53).

If it is a key card (54), the pack 2 is switched over into a controlled access state (55) of operation, i.e. it is customized. The code recorded in the memory 12 of the key card 10 is read and displayed (56) and the value of the control field 18b of the memory zone 18 of the authorization and/or inhibition means 16 of the transfer module 3 takes the value of the code of the key card 10 (57). The control field 18b also located in the memory zone 18 of the authorization and/or inhibition means 16 of the transfer module 3 then takes the value 1 in such a way as to report the passing of the pack into the state of controlled operation (58). The card 10 is then ejected or removed from the pack 2 (59).

If the inserted card is not a key card (60), it is a consumable units card 5 and, since the pack 2 works in free access mode, the card 6 can be processed so as to decrement the consumable units recorded in its memory 12 (61).

If the value contained in the code field 18a of the memory zone 18 of the authorization and/or inhibition means 16 of the transfer module 3 is different from 0 (62), the box works solely in the mode of operation with controlled access. The value of the control field 18b is checked (63) so as to inform the circuit 5 as to whether the attempt made is a first, second or nth attempt to insert the card. If the number of attempts is greater than the limit number of attempts allowed (64), the message "STOP" is displayed (65) and the card is ejected or removed (66). If the number of attempts is smaller than the limit number of attempts allowed (67), the card inserted into the pack is then checked (68) by the electronic circuit 5 in order to determine whether it is a card with consumable units or a key card. If it is a key card (84), the value of the code contained in the memory zone 18 of the authorization and/or inhibition means 16 of the transfer module 3 is compared with the code of the key card (85). If the two codes are equal (86), the value of the control field 18b is brought to 0 (87) so as to inform the electronic circuit 5 that the code checked is the right one. The key card is then ejected or removed (66). If this is not so (88), the value of the control field 18b is incremented by one unit (40) and then checked in order to determine whether this attempt to insert the card is prohibited (70). If this is the case (71), the message "STOP" is displayed (65) and the card is ejected or removed. The operation of the pack is then inhibited. If the attempt is allowed (72), the message "KEY ATTEMPT No. X", X corresponding to the control field 18b number minus 1, is displayed (73) and the card is ejected or removed (66).

If the inserted card is not a key card but a card with units (74), the value of the control field 18b is tested (75) so as to determine whether it is equal to or different from 0, i.e. whether the appropriate key card has been truly introduced beforehand to the card with units 6. If the control field 18b is equal to 0 (76), then the key card has necessarily been introduced beforehand to the card with units and the operation of the device is permitted. The value of the control field 18b is again fixed at 1 (77) and the card is processed (61). If the value of the control field 18b is different from 0 (78), this value is incremented by one unit (69) and then checked to determine whether it is greater than the number of attempts allowed (70). If this is the case (71), the message "STOP" is displayed (65) and the card is ejected or removed. The operation of the pack is then inhibited. If the attempt is allowed (72), the message "KEY ATTEMPT No. X", X corresponding to the control field 18b number minus 1, is displayed (73) and the card is ejected or removed (66).

According to FIG. 4, the operation of the system 1 is identical to the operation whose flow-chart is shown in FIG. 2. At the first insertion of the key card 6, the access code is displayed (56) and the user than has a choice available to him (80), starting from the second attempt to insert the key code, as regards the mode of access to the operation of the pack:
  either he inserts the key card before the use of the card with units,
  or he enters the access code (81), revealed to him at the first insertion, by means of the keyboard 17 of the pack 2.

Assuming that the pack 2 has only two buttons and does not have a keyboard 17, the user can enter the code by the following method:
  1) the pressing of both buttons simultaneously;
  2) the display of a dash on the first position of the screen 15;
  3) the selection of the first digit of the code by means of one of the buttons;
  4) the validation of the first digit by the pressing of both buttons simultaneously;
  5) the display of a dash on the second position of the screen 15;
  6) the selection of the second digit by means of one of the buttons;
  7) the validation of the second digit by the pressing of both buttons simultaneously;
  8) actions identical to 5 to 7 for the third and fourth digits of the code.

Naturally, other methods of using a system such as this for the using up of consumption units according to the invention could be envisaged by those skilled in the art without going beyond the scope of the present invention.

What is claimed is:

1. An electronic system of the type comprising:
  at least one portable device comprising an electronic storage memory;
  at least one device including a transfer module designed to be coupled temporarily with at least said portable object so as to set up a communication link with said memory,
wherein said system comprises a set of specialized portable objects for the access control function and wherein said device comprises two states:
  a free access state in which the operation of the device is achieved without its being necessary to have recourse to a portable object for access control,
  a controlled access state in which the working of the device is conditional upon the coupling, at least occasionally, of one of said portable objects for access control.

2. A system according to claim 1, wherein said controlled access state is a latent state when said device is in the free access state, said device being placed irreversibly in the controlled access state as soon as one of said portable objects for access control has been coupled thereto at least once.

3. A device for the implementation of a system according to claim 1 including a transfer module comprising means to authorize and/or inhibit the operation of said device, and comprising a memory zone having a code field designed to receive an access code,
  wherein said authorizing and/or inhibition means comprise means for the comparison of said memorized access code with an access code given by the user.

4. A device according to claim 3, comprising means for the memorization of said access code in said code field at the first coupling of the transfer module with a portable object for access control bearing an access code, the access code memorized in said code field being the access code borne by said first coupled, portable object for access control.

5. A device according to claim 3, wherein the means by which the user gives the access code comprise the coupling of a portable object carrying said access code and/or the use of a keyboard to enter said code.

6. A device according to claim 3, wherein said inhibition and/or authorization means include a control field or flag placed in said memory zone,
  wherein the value contained in said control field is updated by said means for comparing the memorized access code with the access code introduced by the user, and wherein said inhibition and/or authorization means authorize or inhibit the operation of the device as a function of said value contained in said code field.

7. A device according to claim 6, wherein said code field is a counter of failed attempts, by the user, to give said access code, and wherein said inhibition and/or authorization means inhibit the operation of the device when said counter goes beyond a predetermined threshold.

8. A method for the use of a system according to claim 1, wherein said portable objects for access control have to be inserted into said device before each instance of use of this device.

9. A method for the use of a system according to claim 1, wherein said portable objects for access control have to be inserted into said device every N times that this device is used or every X periods.

10. A system for the using up of consumption units of the type comprising:
- a plurality of portable objects, each comprising an electronic storage memory;
- at least one device including a transfer module designed to get coupled temporarily with at least one of said portable objects so as to set up a communications link with said memory, the operation of said device being automatically linked to the consumption of said consumption units, wherein said system comprises a first set of specialized portable objects for the access control function and a second set of specialized portable objects for the storage of consumable units, wherein said transfer module comprises means to authorize and/or inhibit the operation of said device, wherein said authorizing and/or inhibiting means are controlled by said portable objects for access control, and wherein said device comprises two states:
- a free access state, in which the operation of the device is carried out without its being necessary to have recourse to a portable object for access control,
- a controlled access state, in which the operation of the device is conditional upon the coupling, at least occasionally, of one of said portable objects for access control.

11. A system for the consumption of consumption units according to claim 10, wherein said controlled access state is a latent state when said device is in the free access state, said device being placed irreversibly in the controlled access state when one of said portable objects for access control has been coupled thereto at least once.

* * * * *